United States Patent
Hossain

(10) Patent No.: US 9,306,428 B2
(45) Date of Patent: Apr. 5, 2016

(54) MOTOR COOLING SYSTEM WITH POTTED END TURNS

(71) Applicant: Noman Hossain, Fort Wayne, IN (US)

(72) Inventor: Noman Hossain, Fort Wayne, IN (US)

(73) Assignee: Remy Technologies, LLC, Pendleton, IN (US)

( * ) Notice: Subject to any disclaimer, the term of this patent is extended or adjusted under 35 U.S.C. 154(b) by 538 days.

(21) Appl. No.: 13/622,798

(22) Filed: Sep. 19, 2012

(65) Prior Publication Data

US 2014/0077635 A1  Mar. 20, 2014

(51) Int. Cl.
| | | |
|---|---|---|
| H02K 9/00 | (2006.01) | |
| H02K 5/20 | (2006.01) | |
| H02K 9/19 | (2006.01) | |
| H02K 9/22 | (2006.01) | |
| H02K 15/12 | (2006.01) | |

(52) U.S. Cl.
CPC .. *H02K 5/20* (2013.01); *H02K 9/19* (2013.01); *H02K 9/22* (2013.01); *H02K 15/12* (2013.01)

(58) Field of Classification Search
USPC .......................................... 310/52, 64, 86–88
See application file for complete search history.

(56) References Cited

U.S. PATENT DOCUMENTS

| | | | | |
|---|---|---|---|---|
| 5,004,042 | A * | 4/1991 | McMorries et al. | 165/41 |
| 5,030,865 | A * | 7/1991 | Rockey et al. | 310/78 |
| 6,445,095 | B1 * | 9/2002 | Liang et al. | 310/64 |
| 7,948,126 | B2 * | 5/2011 | Fulton et al. | 310/64 |
| 2003/0141769 | A1 | 7/2003 | Kubo | |
| 2011/0304226 | A1 * | 12/2011 | Bradfield | 310/52 |
| 2011/0304227 | A1 * | 12/2011 | Bradfield | 310/52 |
| 2011/0304228 | A1 * | 12/2011 | Bradfield | 310/54 |
| 2012/0181883 | A1 | 7/2012 | Chamberlin et al. | |
| 2012/0212083 | A1 | 8/2012 | Himmelmann | |

FOREIGN PATENT DOCUMENTS

| | | |
|---|---|---|
| JP | 2003-224961 A | 8/2003 |
| JP | 2004-072945 A | 4/2004 |
| KR | 10-2011-0117503 A | 10/2011 |

OTHER PUBLICATIONS

International Search Report and the Written Opinion of the International Searching Authority; PCT/US2013/060141.

* cited by examiner

*Primary Examiner* — Naishadh Desai

(74) *Attorney, Agent, or Firm* — Bose McKinney & Evans LLP

(57) ABSTRACT

A thermal control system includes a stator having conductor end turns at opposite axial ends thereof, and first and second cooling systems respectively disposed at the opposite axial stator ends, each cooling system having a cover, a coolant inlet, a coolant outlet, and at least one cooling channel. Thermally conductive potting compound thermally mates the cooling systems with the end turns. A method of cooling end turns includes providing a cooling system for each axial end of the stator, each cooling system having at least one cooling channel that includes a coolant inlet and a coolant outlet, and thermally mating each cooling system to the respective end turns. A method of cooling end turns includes providing separate cooling systems in each axial end plate of an electric machine, and filling space within the end turns, and between the end turns and the cooling systems, with thermally conductive potting compound.

19 Claims, 5 Drawing Sheets

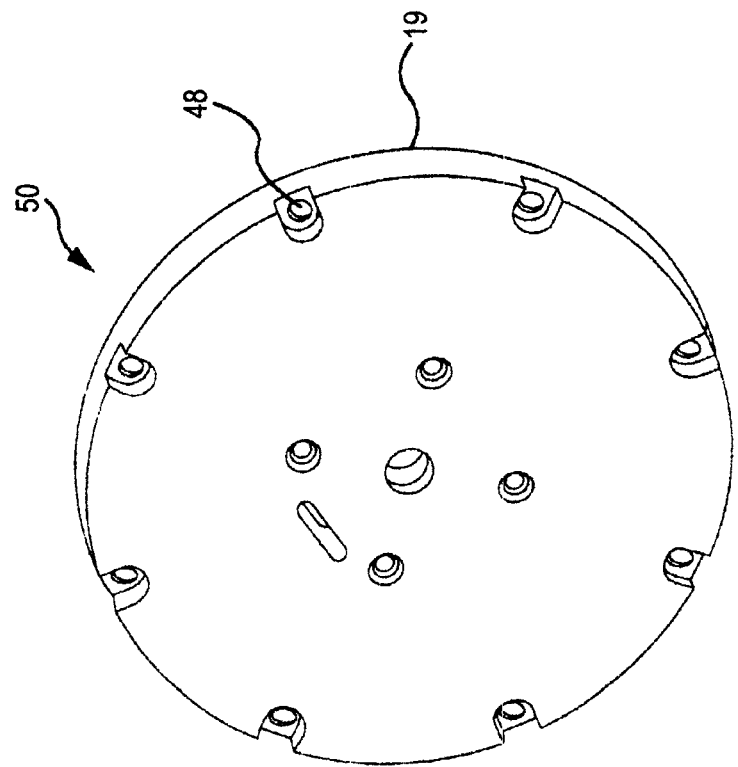
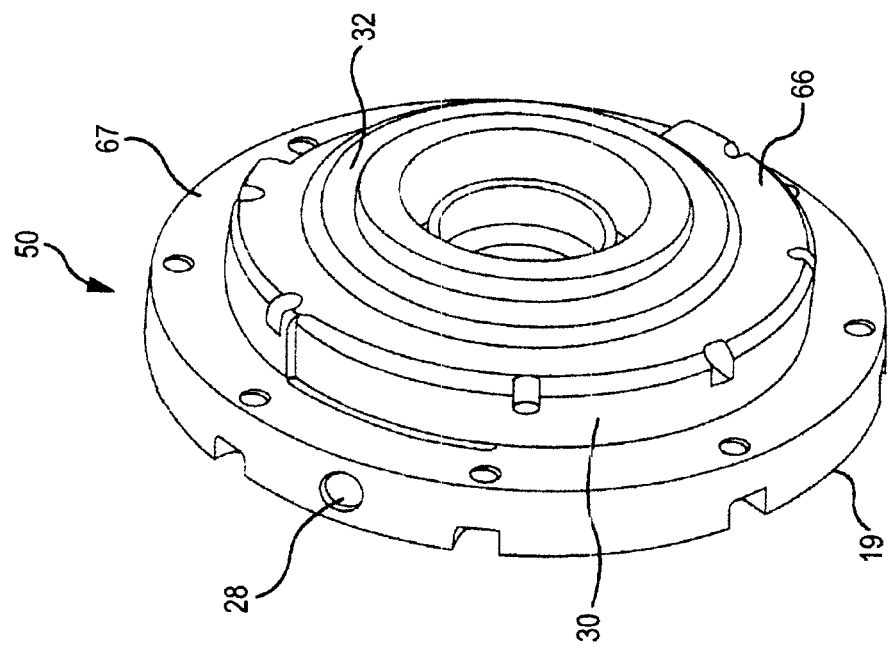

MOTOR COOLING SYSTEM WITH POTTED END TURNS

BACKGROUND

The present invention is directed to improving the performance and thermal efficiency of electric machines and, more particularly, to methods and apparatus for removing heat from stator end turns.

An electric machine is generally structured for operation as a motor and/or a generator, and may have electrical windings, for example in a rotor and/or in a stator. Such windings may include conductor wire formed as solid conductor segments or bars that are shaped to be securely held within a core, bobbin, or other structure. The conductors may be formed of copper, aluminum, or other electrically conductive material by various manufacturing operations, including casting, forging, welding, bending, heat treating, coating, jacketing, or other appropriate processes. Such conductors may be formed as individual segments that are assembled into a stator and then welded together.

The stator has a cylindrical core that secures the conductor segments of the stator windings in slots disposed around the circumference of the core. In many electric machines, the stator core is densely populated so that each angular position has several layers of conductor segments installed therein. In a densely packed stator operating at a high performance level, excessive heat may be generated in the stator windings. In some applications, heat must be actively removed to prevent it from reaching impermissible levels that may cause damage and/or reduction in performance or life of the motor. Various apparatus and methods are known for removing heat. One exemplary method includes providing the electric machine with a water jacket having fluid passages through which a cooling liquid, such as water, may be circulated to remove heat. Another exemplary method may include providing an air flow, which may be assisted with a fan, through or across the electric machine to promote cooling. A further exemplary method may include spraying or otherwise directing oil or other coolant directly onto end turns of a stator.

Rotors of electric machines may include windings, axially extending induction bars, and/or permanent magnets that generate heat. Friction, eddy currents, hysteresis losses, and other aspects of machine operation also generate heat. The aggregate heat may cause lowering of machine efficiency and output, and excessive heat may result in physical damage and mechanical problems.

Conventional electric machines are not adequately cooled. Although various structures and methods have been employed for cooling an electric machine, improvement remains desirable.

SUMMARY

It is therefore desirable to obviate the above-mentioned disadvantages by providing methods and apparatus for minimizing thermal resistance and increasing thermal efficiency.

According to an exemplary embodiment, a thermal control system includes a stator having conductor end turns at opposite axial ends thereof, and first and second cooling systems respectively disposed at the opposite axial stator ends, each cooling system having a cover, a coolant inlet, a coolant outlet, and at least one cooling channel. Thermally conductive potting compound thermally mates the cooling systems with the end turns.

According to another exemplary embodiment, a method of cooling end turns includes providing a cooling system for each axial end of the stator, each cooling system having at least one cooling channel that includes a coolant inlet and a coolant outlet, and thermally mating each cooling system to the respective end turns.

According to a further exemplary embodiment, a method of cooling end turns includes providing separate cooling systems in each axial end plate of an electric machine, and filling space within the end turns, and between the end turns and the cooling systems, with thermally conductive potting compound.

The foregoing summary does not limit the invention, which is defined by the attached claims. Similarly, neither the Title nor the Abstract is to be taken as limiting in any way the scope of the claimed invention.

BRIEF DESCRIPTION OF THE DRAWING FIGURES

The above-mentioned aspects of exemplary embodiments will become more apparent and will be better understood by reference to the following description of the embodiments taken in conjunction with the accompanying drawings, wherein:

FIG. 5 is a perspective view of the inner portion of an exemplary end cover/coolant channel assembly for the axial end of a housing having weld type end turns;

FIG. 6 is a perspective view of the outer portion of an exemplary end cover/coolant channel assembly for the axial end of a housing having weld type end turns.

Corresponding reference characters indicate corresponding or similar parts throughout the several views.

DETAILED DESCRIPTION

The embodiments described below are not intended to be exhaustive or to limit the invention to the precise forms disclosed. Rather, the embodiments are chosen and described so that others skilled in the art may appreciate and understand the principles and practices of these teachings.

Figure 1:
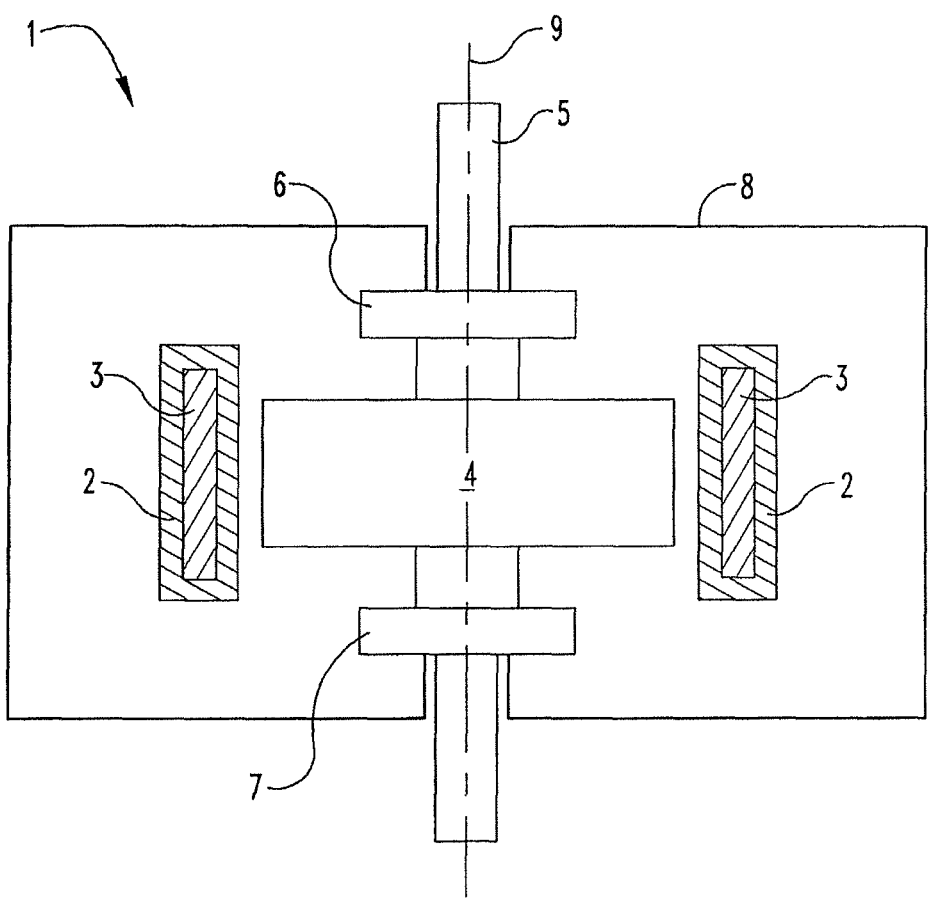
FIG. 1 is a schematic view of an electric machine.

FIG. 1 is a schematic view of an exemplary electric machine 1 having a stator 2 that includes stator windings 3 such as one or more coils. An annular rotor body 4 may also contain windings and/or permanent magnets and/or conductor bars such as those formed by a die-casting process. Rotor body 4 is part of a rotor that includes an output shaft 5 supported by a front bearing assembly 6 and a rear bearing assembly 7. Bearing assemblies 6, 7 are secured to a housing 8. Typically, stator 2 and rotor body 4 are essentially cylindrical in shape and are concentric with a central longitudinal axis 9. Although rotor body 4 is shown radially inward of stator 2, rotor body 4 in various embodiments may alternatively be formed radially outward of stator 2. Electric machine 1 may be an induction motor/generator or other device such as an internal permanent magnet (IPM) type machine. In an exemplary embodiment, electric machine 1 may be a traction motor for a hybrid or electric type vehicle.

Housing 8 may have a plurality of longitudinally extending fins (not shown) formed to be spaced from one another on a housing external surface for dissipating heat produced in the stator windings 3.

Figure 2:
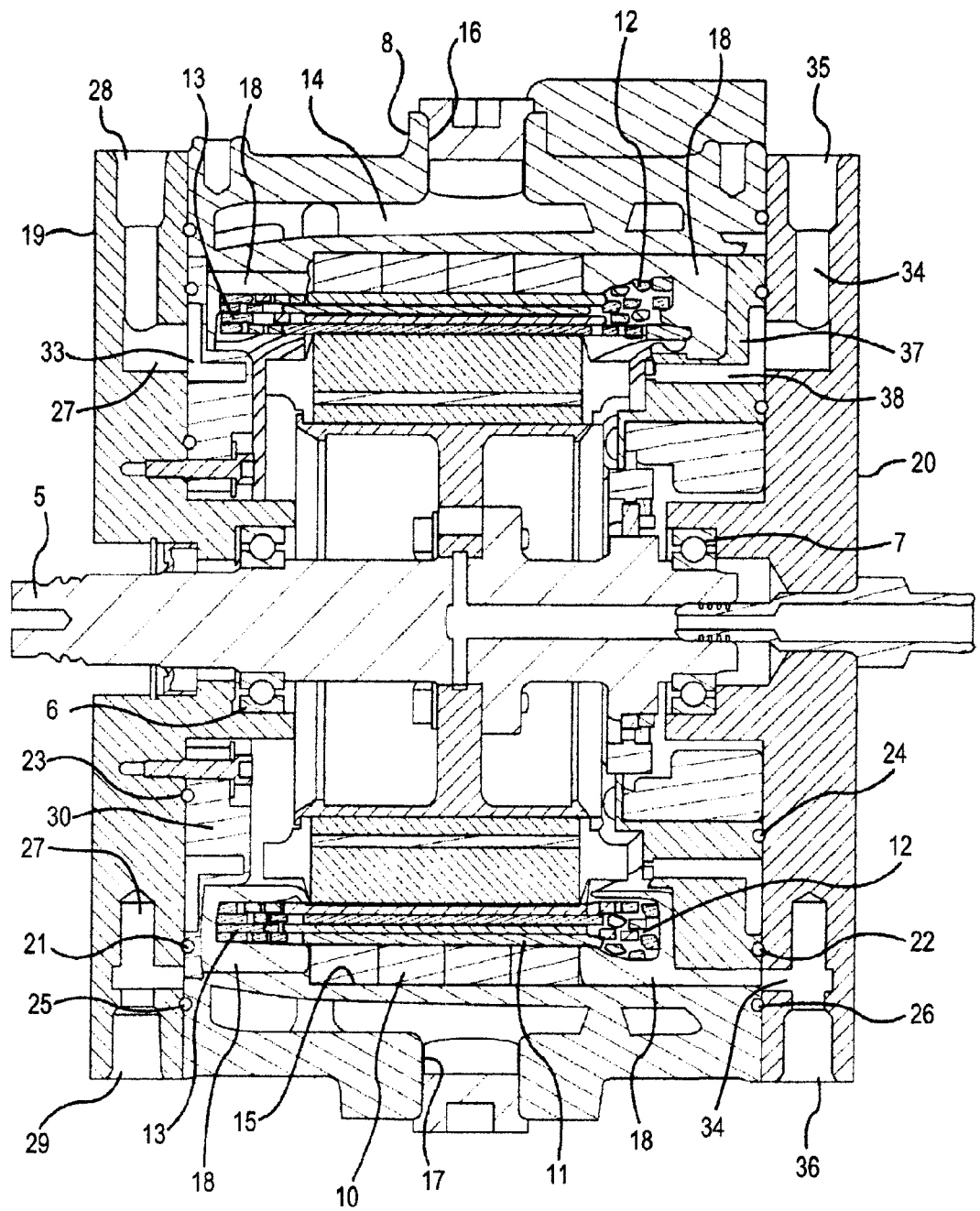
FIG. 2 is a cross-sectional view of a stator coolant system, according to an exemplary embodiment.

FIG. 2 is a cross-sectional view of a stator coolant system, according to an exemplary embodiment. A substantially annular stator body 10 is populated with a number of conductor segments 11. Conductor segments 11 may be formed as hairpins and inserted so that the crown ends of segments 11 extend from one axial end of stator core 10 as end turns 12 and the weld ends of segments 11 extend from the opposite axial end of stator core 10 as end turns 13. Housing 8 is structured for holding bearing assemblies 6, 7 that secure shaft 5. Housing 8 is formed with a substantially annular cooling jacket 14 that is proximate an inner housing surface 15 having an interference fit with stator core 10. Housing 8 includes coolant ports 16, 17 for inputting and outputting coolant to/from cooling jacket 14. For example, hot coolant may be transferred from cooling jacket 14 into an external heat exchanger (not shown) which removes the heat energy received by the coolant. The heat exchanger may be a radiator, oil cooler, or a similar device. Cooling jacket 14 substantially circumscribes portions of stator assembly 2. A thermally conductive potting material 18 is injected for encapsulating end turns 12, 13. End covers 19, 20 enclose the axial ends of housing 8 and are sealed thereto with O-rings 25, 26, gaskets, or other. End covers 19, 20 are typically cast and machined using aluminum or other metal. End cover 19 includes a coolant channel assembly having a chamber/channel 27 with coolant inlet 28 and outlet 29 ports, thereby forming an end plate in which a cooling system according to the present disclosure is disposed at one axial end of the stator. Channel 27 is enclosed by a thin metal shell or dome 30. In an exemplary embodiment, dome 30 is sealed to end cover 19 with O-rings 21, 23. Dome 30 is pressed into engagement with potting material 18 prior to curing, whereby potting material 18 conforms to dome 30 and air is removed between dome 30 and end turns 13 by pressurized injection of potting material 18. Channel 27 may be pressurized and/or surfaces may be cooled/heated during assembly to assure that there is no air trapped within potting material 18. Channel 27 may contain manifold(s), guides, or other internal structure 33 for assuring coolant flow uniformity. At the other axial end of housing 8, end cover 20 is structured and installed in a like manner. End cover 20 includes a coolant channel assembly having a chamber/channel 34 with coolant inlet 35 and outlet 36 ports, thereby forming an end plate in which a cooling system according to the present disclosure is disposed at the opposite axial end of the stator. Channel 34 is enclosed by a thin metal shell or dome 37. In an exemplary embodiment, dome 37 is sealed to end cover 20 by O-rings 22, 24. Dome 37 is pressed into engagement with potting material 18 prior to curing, whereby potting material 18 conforms to dome 37 and air is removed between dome 37 and end turns 12 by pressurized injection of potting material 18. Channel 34 may be pressurized and/or surfaces may be cooled/heated during assembly to assure that there is no air trapped within potting material 18. Channel 34 may contain manifold(s), guides, or other internal structure 38 for assuring coolant flow uniformity.

Figure 4:
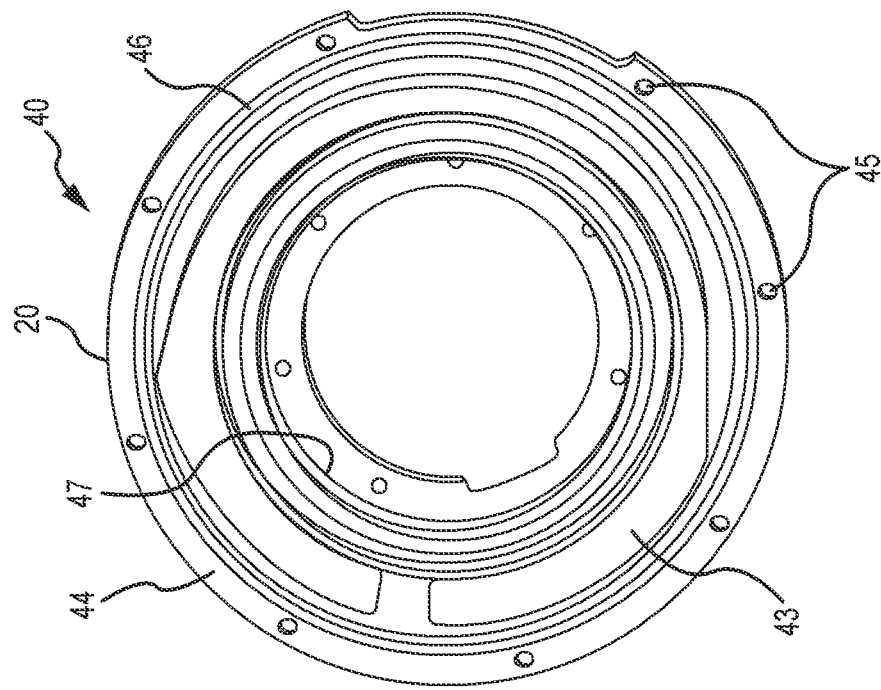
FIG. 4 is a perspective view of the outer portion of an exemplary end cover/coolant channel assembly for the axial end of a housing having crown type end turns.
Figure 3:
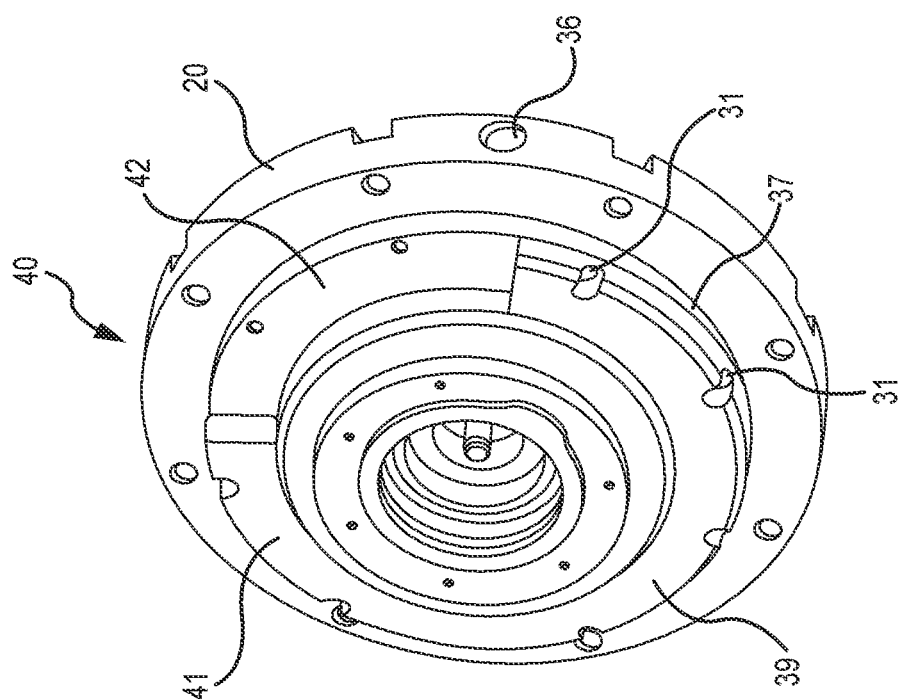
FIG. 3 is a perspective view of the inner portion of an exemplary end cover/coolant channel assembly for the axial end of a housing having crown type end turns.

FIG. 3 and FIG. 4 are perspective views of the respective inner and outer portions of an exemplary end cover/coolant channel assembly 40 for the axial end of housing 8 having crown type end turns 12 (FIG. 2). Dome or shell 37 has a radially inward surface 39 with multiple tiers for accommodating one or more coolant paths therewithin. Fasteners 31 secure dome 37 to end cover 20. Coolant outlet 36 is formed in a sidewall of end cover 20. A first end turn cooling tier 41 may be radially inward of a second end turn cooling tier 42 when the associated space within housing 8 is available. In order to provide uniform cooling when available internal space dictates the use of different tiers or levels in a circumferential direction, the enclosed coolant channels may have differing corresponding widths or conductance surface areas. For example, the width of channel 43 may be tapered. In another exemplary embodiment, the conductance surface area of a given coolant channel may be increased, such as by shaping the channel in a known serpentine form. The outer perimeter 44 of end cover 20 is substantially flat so that it may be flush with housing 8 when fastened thereto at fastening locations 45. An outer annular sealing location 46 and an inner annular sealing location 47 may have a uniform radially inner surface for securing respective O-rings therein. In such a case, the radial space between outer and inner locations 46, 47 may be utilized as one or more coolant channels.

In an exemplary embodiment, the conductance surface area of a given coolant channel may be increased, such as by shaping the channel in a known serpentine form. The outer perimeter 44 of end cover 20 is substantially flat so that it may be flush with housing 8 when fastened thereto at fastening locations 45. An outer annular sealing location 46 and an inner annular sealing location 47 may have a uniform radially inner surface for securing respective O-rings therein. In such a case, the radial space between outer and inner locations 46, 47 may be utilized as one or more coolant channels.

FIG. 5 and FIG. 6 are perspective views of the respective inner and outer portions of an exemplary end cover/coolant channel assembly 50 for the axial end of housing 8 having weld type end turns 13 (FIG. 2). Dome or shell 30 has a radially inward surface 32 with multiple tiers for accommodating one or more coolant paths therewithin. Coolant inlet 28 is formed in a sidewall of end cover 19. A perimeter mounting surface 67 is flat and may be provided with a gasket or O-ring (not shown) for flush mounting to a corresponding perimeter attachment surface of housing 8. A number of perimeter mounting holes 48 are provided for fasteners (not shown) such as bolts or the like. An end turn cooling tier 66 is typically about 5 mm away from associated weld end turns 13 when assembly 50 is secured to housing 8.

Figure 7:
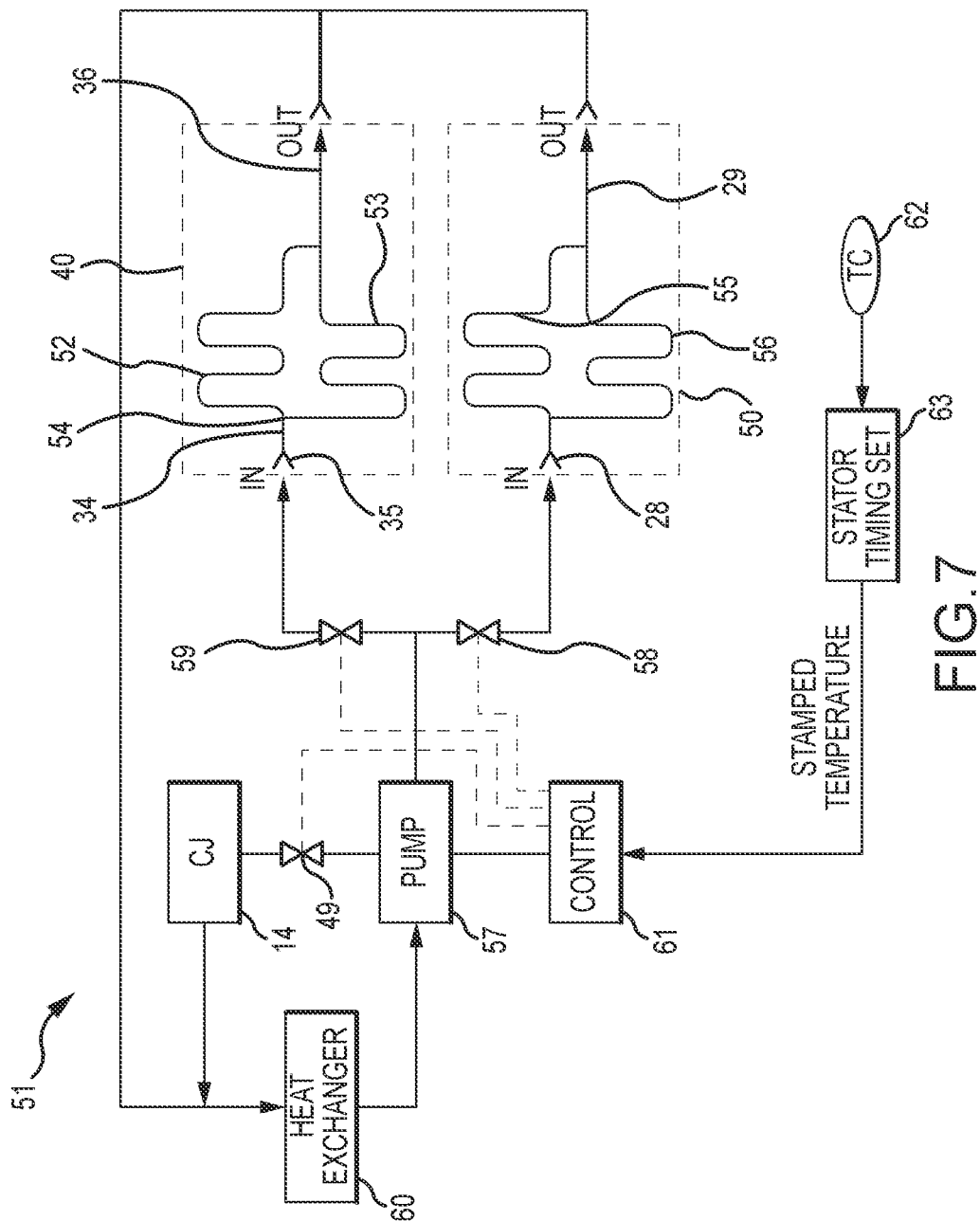
FIG. 7 is a schematic view of a cooling system 51 for electric machine 1, according to an exemplary embodiment.

FIG. 7 is a schematic view of a cooling system 51 for electric machine 1, according to an exemplary embodiment. Crown end cooling assembly 40 includes cooling channels 52, 53 that are connected to coolant inlet 35 via a manifold 54 that may be a partition within chamber 34. Channels 52, 53 combine to feed heated coolant to outlet port 36. Similarly, weld end cooling assembly 50 has one or more internal cooling channels 55, 56 fluidly connected to inlet port 28 and outlet port 29. A pump 57 supplies coolant to inlet ports 28, 35 via respective valves 58, 59. Stator cooling jacket 14 may also be fed by pump 57, where coolant flow thereto may optionally be controlled by a valve 49. The heated coolant being output by cooling assemblies 40, 50 and by cooling jacket 14 may be combined, such as at a sump area (not shown) of electric machine 1, whereby the combined heated coolant is fed to a heat exchanger 60 for removal of heat from the coolant. The cooled coolant is then returned to pump 57. A controller 61 receives control and sensor signals for controlling the operation of pump 57 and valves 49, 58, 59. For example, one or more thermocouples 62 measure the temperature(s) at different locations and provide corresponding analog or digital signals to controller 61. Stator 2 may include a circuit 63 containing a clock for time stamping signals from thermocouples 62, whereby data may be analyzed, aggregated, or otherwise utilized for providing information, control signals, history, and for implementing other functions. Coolant temperature, pressure, and flow may thereby be monitored and controlled. Controller 61 may be may be in communication with or integrated into a vehicle engine control module (ECM) (not shown). For example, a cold-starting operation of a vehicle may cause the ECM to limit electrical and/or mechanical power availability to pump 57, or a recurring sequence of starting operations for a hybrid vehicle may delay or modulate such power. Controls for the operation of pump 57 and valves 49, 58, 59 may alternatively be distributed, or independently based on a self-contained logic, for example including temperature, motor speed, voltage, or current sensor signals sent directly to controller 61.

In various embodiments, electric machine 1 may include more than one cooling jacket 14, and cooling assemblies 40, 50 may contain any number of common or independent coolant channels. Associated control may include any number of valves for regulating and controlling coolant flow to the various jackets, assemblies, and channels. For example, multiple channels within a cooling assembly 40, 50 may be independently controlled, such as by use of additional valves and control signals. A suitable coolant may include transmission fluid, ethylene glycol, an ethylene glycol/water mixture, water, oil, motor oil, a gas, a mist, any combination thereof, or another substance. The channels may be formed of thermally conductive and substantially non-magnetic material. For example, domes 30, 37 may be formed of metal, high temperature thermoplastic, or other thermally conductive materials having suitable rigidity and strength, whereby the channel shape does not become deformed or leak during assembly or when exposed to high temperature and internal pressure. Internal passages, manifolds, and the like may be formed to direct coolant flow and also to provide the necessary strength by serving as a structural support framework. The thickness of domes 30, 37 is typically less in areas nearest end turns 12, 13. Providing greater thickness in other areas of domes 30, 37 may improve structural integrity. For example, channels may be required to maintain an internal pressure of 8-10 psi or greater. By completely filling end turns 12, 13 and space between the end turns and the thinner portions of domes 30, 37 with potting material 18, the heat of end turns 12, 13 is conducted to the coolant flow through a short distance and through thermally conductive materials.

While various embodiments incorporating the present invention have been described in detail, further modifications and adaptations of the invention may occur to those skilled in the art. However, it is to be expressly understood that such modifications and adaptations are within the spirit and scope of the present invention.

What is claimed is:

1. A thermal control system of an electric machine, comprising:
   a stator having conductor end turns at opposite axial ends thereof;
   an end plate located at each axial end of the stator;
   separate first and second cooling systems each disposed in a respective end plate, each cooling system having a cover, a coolant inlet, a coolant outlet, and at least one cooling channel; and
   thermally conductive potting compound located at each axial end of the stator within the end turns and between the end turns and the respective first or second cooling system at each axial end of the stator, for thermally mating the cooling systems with the end turns.

2. The system of claim 1, further comprising first and second channel shells respectively enclosing the cooling channels of the first and second cooling systems.

3. The system of claim 2, further comprising first and second O-rings disposed between portions of the first and second channel shells and the first and second covers, respectively.

4. The system of claim 1, wherein the cooling channels each include a manifold for distributing coolant between the inlet and the outlet.

5. The system of claim 1, wherein the cooling channels are substantially circular and radially aligned with the end turns.

6. The system of claim 1, wherein the potting compound is an integral part of the at least one cooling channel.

7. The system of claim 1, wherein the coolant inlets and the coolant outlets each extend radially.

8. The system of claim 1, further comprising a stator body cooling system having a jacket that circumscribes the stator.

9. The system of claim 8, further comprising a coolant flow controller structured for selectively enabling coolant flow through the stator body cooling system and the first and second cooling systems.

10. The system of claim 9, further comprising a temperature detector outputting a signal indicative of a temperature of the electric machine, wherein the enabling of coolant flow is based on the signal.

11. The system of claim 8, wherein the jacket and cooling channels share a common coolant.

12. A method of cooling end turns at opposite axial ends of a stator, comprising:
    providing separate first and second cooling systems, each cooling system being disposed in a respective end plate at the opposite axial ends of the stator, each cooling system having at least one cooling channel that includes a coolant inlet and a coolant outlet; and
    thermally mating each cooling system to the respective end turns with a thermally conductive potting compound in a space within the end turns and between the end turns and the respective first or second cooling system at each axial end of the stator.

13. The method of claim 12, further comprising providing a cooling jacket for cooling a body portion of the stator.

14. The method of claim 13, further comprising pumping coolant through the cooling jacket and both cooling systems.

15. The method of claim 13, further comprising controlling coolant flow through the cooling jacket and the cooling systems based on a measured temperature of the stator.

16. The method of claim 12, wherein the cooling systems each contain a cooling channel, and wherein the thermal mating includes pressing the cooling channels into the potting material prior to curing.

17. A method of cooling end turns of a stator, comprising:
    providing an electric machine with the stator and end turns;
    providing first and second axial end plates, the first and second axial end plates being respectively disposed at opposite axial ends of the stator;
    providing a separate cooling system in each of the first and second axial end plates; and
    filling space within the end turns and between the end turns and the cooling systems with thermally conductive potting compound at each axial end of the stator.

18. The method of claim 17, wherein the cooling systems each include a substantially circular cooling channel, and wherein the cooling channels are embedded into the potting compound.

19. The method of claim 17, further comprising pumping coolant through the axial ends' cooling systems and through a separate cooling jacket circumscribing the stator.

\* \* \* \* \*